United States Patent [19]

Clendenen et al.

[11] 3,884,823

[45] May 20, 1975

[54] CERAMIC PERMANENT MAGNET

[75] Inventors: Ronald L. Clendenen, Orinda; Eugene E. Olson, Oakland; Charles M. Schlaudt, Berkeley, all of Calif.

[73] Assignee: Shell Oil Company, Houston, Tex.

[22] Filed: Sept. 27, 1971

[21] Appl. No.: 183,896

[52] U.S. Cl................................ 252/62.63; 423/594
[51] Int. Cl............................................. C04b 35/00
[58] Field of Search........... 252/62.63; 264/DIG. 58; 423/594

[56] References Cited
UNITED STATES PATENTS
3,597,357  8/1971  Cochardt.......................... 252/62.63

OTHER PUBLICATIONS

Haag, "Annual Report I, March '68–69"– Office of Naval Research Contract No0014–68–C–0364.

Haag, "Annual Report II, March '69–70" Office of Naval Research Contract No0014–68–C–0364.

Haag, "Annual Report III, May '70–March '71" Office of Naval Research Contract No0014–68–C–0364.

*Primary Examiner*—Jack Cooper
*Attorney, Agent, or Firm*—Norris E. Faringer; Howard W. Haworth

[57] ABSTRACT

Magnetoplumbites having the formula $MO.nFe_2O_3$, wherein M is strontium and $n$ is from about 3 to about 6.5, having densities of not less than 95% of the theoretical maximum, having average crystallite sizes of less than about 2.0 microns, preferably having at least 90% of their crystallites less than 2.5 microns in diameter and having crystallite orientations of not less than about 95%, yield permanent ceramic magnets having both high coercive forces and remanences.

3 Claims, 4 Drawing Figures x3,000 x3,000

INVENTORS:
RONALD L. CLENDENEN
EUGENE E. OLSON
CHARLES M. SCHLAUDT
BY:
THEIR ATTORNEY

CERAMIC PERMANENT MAGNET

BACKGROUND OF THE INVENTION

1. Field of the Invention

The invention relates to ferrite permanent magnets. More particularly it concerns strontium and barium ferrite anisotropic permanent magnets.

These novel permanent magnets containing strontium ferrite are produced by a special four-step process described and claimed in our copending patent application Ser. No. 183,838, filed Sept. 27, 1971, now abandoned.

2. The Prior Art

Ceramic permanent magnets have a wide spectrum of application, especially in electrical devices such as loudspeakers, motors, and the like. In many applications it is desired to use a magnet having both a high remanence and a high coercive force. Such a magnet is resistant to demagnetization and is magnetically strong.

With conventional ceramic magnets it has been difficult to achieve simultaneously relatively high values for these two properties. This problem is inherent in conventional ceramic magnets and their method of production. To yield an ideal magnet of maximum remanence and coercive force, a ceramic material must have four properties: (a) it must be fully ferritized, that is, there must have been full reaction between the several individual oxides to form a chemically bound mixed oxide ($MO.6Fe_2O_3$) since the individual oxides are not magnetizable; (b) the mixed oxide must be in the form of small crystallites, preferably sized about equal to or just above the size of a magnetic domain, i.e. 0.1 to 1.0 microns; (c) the crystallites must all be oriented, that is, lined up so that their axes of easy magnetization are all parallel; and (d) the material must be as near to the theoretical maximum density as possible.

With conventional preparation methods, such as described by Haag in Annual Report March 1969–70 concerning Office of Naval Research Contract N00014–68–C–0364 or by Sixtus et al. in 27 *Journal of Applied Physics* 105 (September, 1956), those conditions which lead to small crystallite size work against obtaining a full orientation and high density and vice versa.

It is known that metal ferrites having the chemical formula $MO.nFe_2O_3$, wherein M is a metal selected from the group of strontium and barium and wherein $n$ has a value of about 6, say from 3 to 6.5, form permanent magnets. These particular ferrite materials are also called magnetoplumbites. Table I is a listing of the remanences and coercive forces obtained with a variety of barium ferrite and strontium ferrite magnets produced heretofore. Table I verifies that these conventional magnets have not simultaneously had both a high coercive force and high remanence.

Table I

Magnetic Properties of Prior High Coercive Force/High Remanence Magnets

| Manufacturer | Magnet Type and/or Trade Name | Remanence, gauss | Normal Coercive Force, oersteds |
| --- | --- | --- | --- |
| Steward | Ba ferrite F-620 | 3445 | 3000 |
| " | Ba ferrite F-700 | 3350 | 3000 |
| Ferrox Cube Corp. | Ferroxdure 300 | 3700 | 3000 |
| " | Ferroxdure 280 | 3500 | 3000 |
| Indiana General | Indox VII | 3450 | 3200 |
| " | Indox VI-A | 3300 | 3000 |
| Allen-Bradley | M-7 | 3400 | 3250 |
| " | M-8 | 3850 | 2950 |
| General Magnetic Corp. | Genox R5 | 3900 | 2520 |
| " | Genox R6C | 3450 | 3000 |
| Arnold Engin'g Co. | Arnox 6 | 3450 | 3100 |
| " | Arnox 7 | 3550 | 3350 |
| " | Arnox 9 | 3450 | 3200 |
| Stackpole Carbon | Ceramagnet A70 | 3400 | 2800 |
| Crucible Magnetics | Ferrimag 8 Sr Ferrite | 3850 | 2950 |
| " | Ferrimag 7 Sr Ferrite | 3450 | 3300 |
| Cochhart | U.S. 3,113,927 Sr Ferrite | 4000 | 3150 |

STATEMENT OF THE INVENTION

It has now been found that a ceramic permanent magnet simultaneously having a normal coercive force of not less than 3600 oersteds and a remanence of not less than 3600 gauss, is prepared from a magnetoplumbite of the formula $MO.nFe_2O_3$; wherein M is strontium and $n$ has a value of from 3 to 6.5; wherein the density is not less than 95% of the theoretical maximum, the average crystallite size is less than 2.5 microns and the crystallite orientation is not less than 95%.

This invention will be further described below with reference to the drawing wherein FIGS. 1 and 2 are magnet hysteresis loops and FIGS. 3 and 4 are scanning electron photomicrographs, respectively, of magnets in accordance and not in accordance with this invention.

DEFINITION OF TERMS

As this invention is directed to magnets with improved properties, for the sake of completeness it is desirable to set out precisely what these properties are and their importance. This will be done with reference to FIG. 1 of the drawing. FIG. 1 is a graphic representation of the amount of magnetic flux induced in a permanent magnet material when it is exposed to a varying magnetizing-demagnetizing field. It is in the form of two quadrants of an intrinsic hysteresis loop. FIG. 1 also contains a portion of the normal hysteresis loop for the same material.

A sample of unmagnetized material by definition has no induced flux at O field and thus is at point O in FIG. 1. As an increasing magnetizing external field (+H) is applied, the flux induced in the sample follows in line OW and reaches a constant value referred to as the saturation magnetization ($B_s$). As the positive field is reduced, the flux follows the line WX. The flux remaining when the field has been reduced to zero is termed the remanence ($B_r$). As an increasing demagnetizing external field is applied (−H), the induced flux follows the line XY. The demagnetizing field required to decrease the induced flux to zero is referred to as the intrinsic coercive force ($H_{ci}$) of the material. Alternatively, as the demagnetizing field is increased, the normal induced flux will decrease to zero along line XZ. The point at which the normal induction reaches zero is termed the normal coercive force ($H_c$).

As can thus be seen, the resistance to demagnetization which a material possesses is indicated by the intrinsic coercive force, $H_{ci}$. The strength of a magnet is given in part by the value of the remanence. The product of induction and external field as given by the normal demagnetization curve (line XZ) reaches a maximum at some B and H. The value of this product is used as a figure of merit for permanent magnet materials and is referred to as $BH_{max}$ or the energy product. It may be seen from FIG. 1 that the remanence must be equal to or less than the saturation magnetization. The intrinsic coercive force must be greater than or equal to the normal coercive force. It may also be seen that the normal coercive force cannot be larger than the remanence or else the intrinsic induction would increase even though a demagnetizing external field is being applied — a physical impossibility.

DETAILED DESCRIPTION OF THE INVENTION

Chemical Composition of the Magnets

The magnets of this invention contain ferric oxide and strontium oxide. The molar ratio of ferric oxide to strontium oxide preferably is between about 4.5 and 6.5. Very preferably it is between about 5.0 and 6.5 inclusive.

The magnets may contain minor amounts, for example, up to about 10% by weight, basis the total weight, of additives such as PbO, $Al_2O_3$, $ZrO_3$, $B_2O_3$, $Bi_2O_3$, $CaF_2$, $SrSO_4$, $CaSO_4$, and the like.

Magnetic Properties of the Magnets

The most striking features of the magnets of this invention are their unusual combination of high remanences and coercive forces.

The ceramic magnets of this invention are generally characterized as having remanences of greater than 3600 gauss as well as normal coercive forces of greater than 3600 oersteds. The strontium ferrite magnets of this invention are more precisely characterized as having remanences of from 3650 gauss to 4500 gauss in combination with normal coercive forces of from 3650 oersteds to about 4500 oersteds; and are most precisely characterized as having both remanences of from 3700 gauss to about 4500 gauss and normal coercive forces of from 3700 oersteds to about 4500 oersteds.

Figure 1:
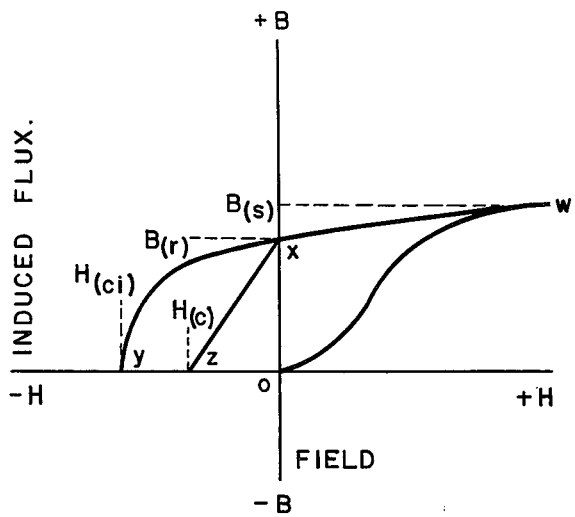
Figure 2:
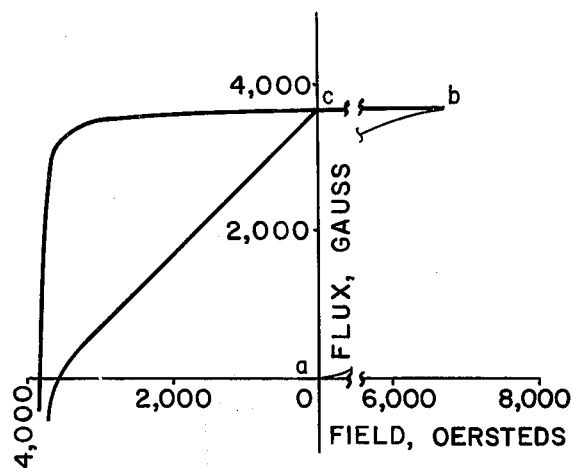

The magnets of this invention are further characterized as having remanences which are substantially equivalent to their saturation magnetization. This feature is illustrated by FIG. 2, a graph illustrating the magnetic properties of a strontium ferrite in accord with this invention. As an increasing magnetic field is applied to a sample of unmagnetized strontium ferrite of this invention its magnetic flux increases along line $ab$, eventually reaching a maximum (saturation) value $B_s$ at ($b$). Increasing the field further will not increase the flux beyond $B_s$. As the field is reduced to zero, the flux follows line $bc$ and reaches its remanence value $B_r$. As the figure illustrates, the remanence has essentially the same value (3700 gauss) as the saturation magnetization (3780 gauss). By comparison, usual conventional ferrites would exhibit a remanence substantially lower in value than the saturation magnetization.

The ratio of remanence to saturation magnetization is one measure of a magnet's extent of crystallite orientation since crystallographic orientation is related to magnetic orientation. An ideal single crystallite has a remanence along its axis of easy magnetization equivalent to its saturation magnetization. A plurality of crystallites, if perfectly oriented, would exhibit a $B_r/B_s = 1.0$ as well. Thus, the extent of crystallite orientation can be determined by the ratio $B_r/B_s$.

The high strength magnets of this invention find application in a variety of areas, for example in electric motors, in loudspeakers, and in holding applications.

Physical Properties of the Magnets

The magnets of this invention are dense and finely grained and have a high degree of crystallite orientation. The densities of these ceramic magnets are at least 95%, preferably at least 97% and most preferably at least 98%, of the theoretical maximum. The average grain size of these magnets is less than 2.5 microns, preferably in the range of from 0.5 to 2.0 microns and most preferably from 0.6 to 1.5 microns. Not only are the grains of these magnets small in size, they are also uniform in size. Preferably at least about 90% of the grains have diameters of less than 2.5 microns.

Figure 3:
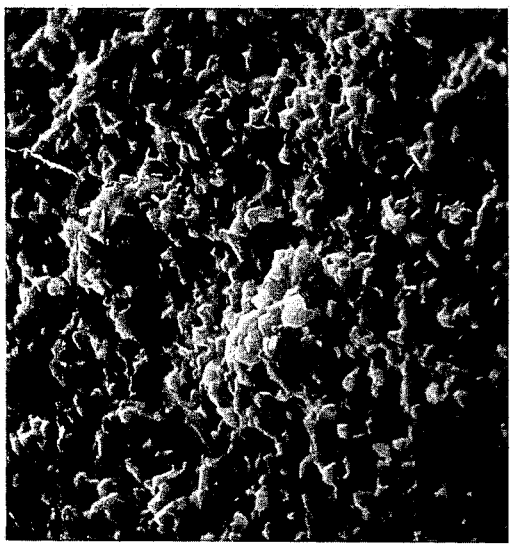
Figure 4:
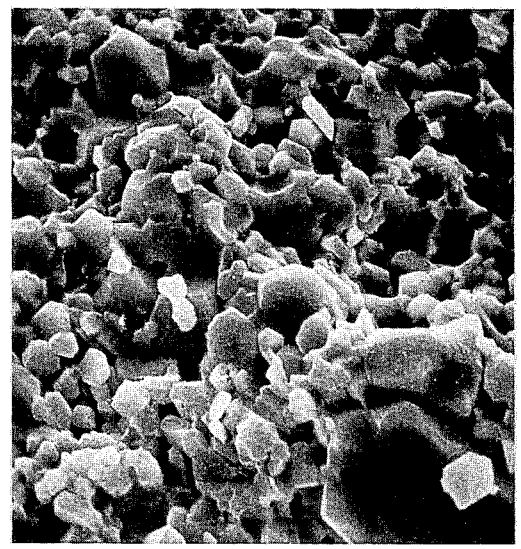

The unique crystal structure of the magnets of this invention is clearly shown by a scanning electron microscope. FIGS. 3 and 4 are equivalent scanning electron photomicrographs respectively of a magnet of this invention and an excellent quality conventional ferrite magnet (sold under the tradename Steward 504) showing the uniform fine grain size of the present magnets and the irregular grain size of conventional materials. The grains of the magnets of this invention are highly oriented. This is shown by the virtual equivalence of the remanence and saturation magnetization. Suitably, at least 90% of the crystallites are oriented, with orientations (as shown by the ratio of remanence over saturation magnetization) of not less than 95% being preferred.

As pointed out above, this combination of full orientation and small grain size has not been achieved heretofore since production conditions in conventional processes which lead to full orientation oppose a small grain size.

Preparation of the Magnets

Ferrite ceramic permanent magnets in accord with this invention, having both small grain size and full crystallographic orientation and thus both high coercive forces and remanences, are prepared by a hot forging process when this process is carried out under certain controlled conditions. This process comprises the steps of:

a. preparing solid particles comprising an intimate agglomerate of suitable proportions of less than 0.1 micron grains of ferric oxide and strontium oxide;

b. heating these particles for up to 24 hours at a temperature in the range of from 800°C to 1100°C sufficient to effect at least a partial chemical reaction between the mixed metal oxides (ferritization) and produce less than 0.5 micron diameter ferrite crystallites of strontium ferrite;

c. heating the at least partially ferritized particles for up to 2 hours at 800°C to 1300°C (preferably while applying up to 30,000 psi pressure) to effect at least a partial sintering together of the particles into a solid body;

d. heating at 800°C to 1300°C and pressing at up to 30,000 psi (hot forging) the resulting sintered body to densify it to at least 95% of theoretical maximum, to completely ferritize it, and to deform it and thus align its magnetic crystallites; and e. magnetizing the resulting ferrite compact by conventional means to give a permanent magnet.

In the first step of this process small solid particles are prepared which consist essentially of ferric oxide, strontium oxide, and any desired additives. These components should be present in the same proportions as desired in the finished magnets.

The particles formed in this step are themselves agglomerates of particles of the iron oxide and strontium oxide. With any of these compositions, it is very desirable that these agglomerates be small and is essential that the particles which make up the agglomerates be very small in size. The agglomerates must be made up of particles of ferric oxide and strontium oxide which are less than 0.1 microns in diameter. Preferably the individual oxide particles which make up the agglomerates are from 0.005 to 0.1 microns in diameter.

Suitable agglomerated particles are produced by several techniques. In one method, for example, they are prepared by coprecipitating a mixture of decomposable compounds of the metals and then thermally decomposing the precipitate. Other techniques include for example spray drying or spray roasting a mixed salt solution. These methods all lead to very intimately mixed agglomerates of less than 0.1 micron particles of ferric oxide and strontium oxide.

Using the coprecipitation technique, a solution of correct molar ratio, most conveniently in water, of soluble ferric and strontium, and/or additive salts is first prepared. Examples of suitable salts include, ferric chloride, nitrate, acetate, chlorate, formate and oxalate; and strontium nitrate, nitrite, chloride, and acetate. The solution of salts is then treated with a precipitating agent which gives a thermally decomposable precipitate. Examples of suitable precipitating agents are hydroxyl ion, carbonate ion, and the like. Preferred precipitating agents are hydroxide ion and carbonate ion in amount of from about one to about ten times the stoichiometric amount required for precipitation of all the metal ions present.

The mixed precipitate is separated and thermally decomposed in an oxygen-containing atmosphere to give the agglomerated particles of the oxides. Generally, an exposure of from about 2 to 24 hours to temperatures in the range of from about 500°C to about 750°C is adequate to carry out the decomposition. Longer times and higher temperatures may be required with very difficult to decompose salts.

Using the spray drying technique, first a solution is prepared containing a decomposable ferric salt and one or more decomposable salts of strontium in the desired 3:1 to 6.5:1 molar ratio. Suitable salts include nitrates, carbonates, acetates, chlorides and like materials which decompose when heated. Any additives should also be present in this solution to ensure their ultimate intimate admixture with the principal metal oxides. The solution is atomized into a chamber maintained at an inlet drying temperature in the range of from about 100°C to about 600°C, preferably from 200°C to 500°C, to form small, dry particles of mixed decomposable salt. These particles are then thermally decomposed in an oxygen-containing atmosphere. This decomposition step is similar to that described with the coprecipitation method of forming particles and requires similar conditions.

Using the spray roasting technique, a solution of decomposable salts is prepared and atomized into a chamber or fluidized bed having an oxygen-containing atmosphere heated to a temperature in the range of from 500°C to 1200°C. In one step the particles of mixed decomposable salts are formed and thermally decomposed to mixed oxides.

Each of these techniques gives fine agglomerates having internal particles of oxides which have diameters of not greater than about 0.1 microns.

The particulate solids produced in the first step are agglomerates of essentially distinct grains of ferric oxide and grains of strontium oxide. In this step of the process, these agglomerates are heated to a temperature of 800°C to 1100°C for up to 24 hours to cause these separate oxide grains to chemically react and form small grains of their respective metal ferrite. This heating step is known as ferritizing. It is essential that the temperature and period of this heating be closely controlled. The temperature must be maintained high enough to cause the metal oxides to react with one another, but must not be substantially above the reaction temperature or else undesired particle grain growth will occur. It is not necessary that this ferritization be carried to completion. It is preferred to obtain full ferritization partially by heating in this step and partially by heating with pressure in the next two production steps (forming and forging). When pressure is applied with heat in the forming and forging steps which follow, full ferritization is achieved at lower temperatures and thus with far less chance of undesired grain growth. Temperatures selected in the range of from 950°C to 1100°C are preferred for full or partial ferritization as are heating periods of from 0.5 to 12 hours, it being understood that the higher temperatures require shorter times while lower temperatures require longer times.

Examples of suitable ferritizing conditions are: from about 4 to 12 hours at 950°C, from about 2 to 8 hours at 1000°C and from about 0.5 to 2 hours at 1100°C.

The metal ferrite powder next is formed into a compact solid mass either by the application of heat (sintering) or preferably by the application of heat and pressure. This step is required since an essentially solid body must be employed in the hot forging step which follows to prepare the actual magnetizable oriented ceramic material.

In this sintering step the emphasis is on the relatively quick heating which permits sintering while minimizing grain growth. Generally, heatings of up to about 2 hours at 1100°C to 1300°C give a good sintered product, more specifically, 0.1 to 2.0 hours at 1100°C to 1250°C are preferred. Examples of suitable sintering conditions are about 1.5 hours at 1100°C and about 0.5 hour at 1200°C.

In a preferred method of operation, heat and pressure are both employed to effect compaction and sintering. The use of pressure permits lower temperatures and/or shorter times to be employed and thus further limits grain growth. Very suitable hot pressing conditions are in the range of from 800°C to 1300°C and preferably 900°C to 1200°C and from 1000 to 30,000 psi, preferably 3000 to 20,000 psi. Use of conditions in this range enable suitable compaction to be effected in a total heating cycle of about 10 minutes or less. Typical pressure sintering conditions are:

10 minutes at 950°C and 15,000 psi,
10 minutes at 1050°C and 5,000 psi,
3 minutes at 1050°C and 20,000 psi, and
1 minute at 1200°C and 5,000 psi.

The sintering or hot-pressing may be carried out in an oxygen containing environment (air) in an inert environment (nitrogen) or in a vacuum.

The nature of the product of the sintering (or preferably hot pressing) is critical to the success of this invention. To ultimately yield the desired high quality magnets, it is essential that the product of this step be made up of uniform, less than 1 micron diameter crystallites. When heat and pressure are applied in this step the products are more particularly characterized as being solids, having densities of from 80 to 100% of the theoretical maximum. When heat alone is applied the products are solids of lower density, generally 40 to 80% of the theoretical maximum. These materials must have this lower density because more severe heatings necessary to achieve higher densities also give undesired amounts of grain growth. In this case, full density in addition to crystallite orientation is achieved in the hot forging step. In both cases the solid products are made up of crystallites having an average diameter preferably less than 0.7 micron, especially from 0.3 to 0.7 micron, and having not more than 10% of their diameters greater than 1 micron. Without further treatment, this product might be useful in low quality crude magnet applications, but would not be suitable for the desirable high quality magnets of this invention.

The fine grain solid ferrite body formed in the sintering step has the property of being ductile when heated to a temperature approximating its forming temperature. This property is utilized in the hot forging step to effect the full densification and orientation of ferrite grains essential to the production of an anisotropic permanent magnet. The hot forging is carried out by heating the ferrite body and applying a pressure to it in a manner which deforms it. As in the sintering step, the emphasis is on a rapid treatment with a limited exposure to high temperatures to minimize grain growth. Conditions similar to the hot pressing conditions optionally used to form the solid ferrite body may be used for hot forging. Temperatures of from 800°C to 1300°C, preferably 850°C to 1150°C and pressures of from 1000 to 30,000 psi, preferably 3000 to 10,000 psi, and times of up to about 0.5 hour, preferably up to about 0.2 hour are useful.

The temperature and pressure are most favorably controlled to give a strain rate of from about 1%/min to about 500%/min. The preferred temperature and pressure conditions noted above fall into this area.

The amount of forging, that is, the amount of deformation, should be controlled. A measure of the deformation is expressed by the ratio $$\frac{L - L_o}{L_o}$$

wherein L is the size of the body along the forging axis after forging, and $L_o$ is the size before forging. To achieve the same degree at orientation, non-dense bodies will require different degrees of forging than dense bodies for, in the former, a certain amount of forging will be taken up in the densification process. After the material has been forged to essentially theoretical density, then additional forging will produce bulk flow of the material resulting in orientation. The deformation of a body by forging can be approximated by the equation $$\frac{L - L_o}{L_o} = (\rho_r - 1) + \frac{L - \rho_r L_o}{\rho_R L_o}$$

wherein $\rho_r$ is the density relative to theoretical. The first term in parentheses represents the contribution of densification to forging, and the second term represents the contribution of mass flow. For any given density, the most suitable values for forging, represented by $$\frac{L - \rho_r L_o}{\rho_r L_o}$$

will range from 0.1 to 0.9 with values between 0.5 and 0.7 being preferred.

This deformation orients the crystal structure of the ferrite such that the axes of easy magnetization are all aligned. When this ferrite aligned structure is magnetized in a field maintaining the same orientation as the alignment, a strong permanent magnet is formed.

The magnets of this invention will be further described by the following examples and comparative experiments. These are presented for purposes of illustration and are not intended to limit the scope of this invention.

EXAMPLE I

PREPARATION OF A SrO.5.4 $Fe_2O_3$ MAGNET HAVING A $B_r$ OF 3700 GAUSS AND AN $H_c$ OF 3600 OERSTEDS 4536 grams of $Fe(NO_3)_3.9H_2O$ and 221.6 grams of $Sr(NO_3)_2$ were dissolved in 7 gallons of water. This solution was dried in a Niro brand portable spray drier. The spray drier inlet temperature was 435°C and exit temperature was 160°C. The material from the spray drier was placed in ceramic crucibles and heated in air to 600°C for 15½ hours to remove residuals.

To ferritize the material, the crucibles containing the powder were placed in a furnace at 1000°C for 4 hours in air. The calcined material was somewhat lumpy, but was easily crushed to pass an 80 mesh sieve.

The ferrite powder was loaded into a graphite die and then heated in vacuum to 1000°C in a graphite heating element furnace. A pressure of about 4000 psi was applied. Vacuum ranged from 35 microns to about 350 microns during the operation. The sample was held at 1000°C for about 10 minutes to effect sintering. The sintered sample was pushed out at the hot pressing cavity in the die into a larger cavity in the die where the sample was forged at 4000 psi and 1000°C for 5 minutes to give a deformation ($L - L_o/L_o$) of about 60%. After forging, the sample was cooled in the die, removed, and its properties were measured.

Its properties were as follows:

density = 4.92 gm/cc (96% of theoretical maximum)
$B_s$ = 3780 gauss
$B_r$ = 3700 gauss
$H_c$ = 3600 oersteds
$H_{ci}$ = 3820 oersteds
$BH_{max}$ = 3.3 × 10⁶ gauss . oersteds FIG. 2 shows the hysteresis loop for this material. Examination of this material by scanning electron microscope showed that it was composed of oriented crystallites having an average diameter of 1.0 microns of which not more than 10% were larger than 2.0 microns.

EXAMPLE II

PREPARATION OF SrO.5Fe₂O₃ MAGNET BY VACUUM HOT PRESSING AND AIR FORGING

A. Starting Material Preparation 908 grams of Fe(NO₃)₃·9H₂O and 47.5 grams of Sr(NO₃)₂ were dissolved in 7 gallons of water. This solution was dried in a Niro brand portable spray drier. The inlet temperature was 435°C and outlet temperature was 160°C. The material from the spray drier was placed in ceramic crucibles and heated in air to 600°C for 15¾ hours to remove residual nitrates.

B. Ferritization

To ferritize the material, the crucibles containing the powder were placed in a furnace at 1000°C for 3½ hours in air. The particles of calcined material lumped together somewhat, but were easily crushed to pass an 80 mesh sieve.

C. Hot Pressing

The ferrite powder was loaded into a graphite die and then heated to 1000°C in a graphite heating element furnace. Applied pressure was about 4000 psi. Vacuum ranged from 35 to about 350 microns during the hot pressing operation. The sample was held at temperature for about 10 minutes to effect sintering. The sample was cooled in the furnace, removed, and cored into smaller specimens which were later to be hot forged. Property measurements on the hot pressed sample gave the following results:

density = 4.73 gm/cc
$B_s$ = 3150 gauss
$B_R$ = 2400 gauss
$H_c$ = 2200 oersteds
$H_{ci}$ = 5520 oersteds D. Hot Forging A sample was cored from the hot pressed material and forged. The strain rates of the forging was constant at 10%/min and the forging temperature was 1100°C in air. The sample was placed in a cold furnace, the furnace then being heated to the forging temperature in 9 minutes. The sample was allowed to equilibrate for 15 minutes at temperature, then sufficient load was applied to deform the specimen at the required rate. The sample was cooled in air, removed from the furnace and its properties were measured as follows:

$$\frac{L - L_o}{L_o} = 0.59$$

density = 4.74 g/cc (97% of theoretical)
$B_s$ = 3650 gauss
$B_r$ = 3620 gauss
$H_c$ = 3600 oersteds
$H_{ci}$ = 3980 oersteds
$BH_{max}$ = 3.2 × 10⁶ gauss . oersteds The magnet was examined by electron microscope. FIG. 3 is an electron photomicrograph of this material showing its uniform internal structure of crystallites averaging 1.0 micron in diameter with not more than 10% greater than 2.0 microns in diameter. For comparison, FIG. 4 is provided, a similar electron photomicrograph of a conventional ceramic magnet (Steward 504).

We claim as our invention:

1. A permanent ceramic magnet having a normal coercive force of not less than 3600 oersteds and a remanence of not less than 3600 gauss consisting essentially of a magnetoplumbite of the formula MO.$n$Fe₂O₃ wherein M is strontium and $n$ has a value of from 3 to 6.5; and having a density of not less than 95% of the theoretical maximum, an average grain size of less than 2.0 microns, not less than 90% of its grains less than 2.5 microns in diameter and a crystallite orientation of not less than 95%.

2. The magnet in accordance with claim 1 wherein M is strontium and $n$ has a value of from 5.0 to 6.5.

3. The magnet in accordance with claim 2 having a density of not less than 98% of the theoretical maximum and an average grain size of from 0.6 to 1.5 micron.

* * * * *